United States Patent [19]

Humpert

[11] 4,258,751
[45] Mar. 31, 1981

[54] SLIDE PLATE FOR VALVES

[75] Inventor: Jürgen Humpert, Hemer, Fed. Rep. of Germany

[73] Assignee: Friedrich Grohe Armaturenfabrik GmbH & Co., Hemer, Fed. Rep. of Germany

[21] Appl. No.: 968,482

[22] Filed: Dec. 11, 1978

[30] Foreign Application Priority Data

Dec. 23, 1977 [DE] Fed. Rep. of Germany ....... 2757672

[51] Int. Cl.³ .............................................. F16K 11/06
[52] U.S. Cl. .................................. 137/625.4; 251/368
[58] Field of Search ........... 137/625.4, 625.25, 625.41; 251/368

[56] References Cited

U.S. PATENT DOCUMENTS

| 10,417 | 1/1854 | Wilson | 137/625.25 |
| 126,379 | 5/1872 | Cooke | 137/625.25 |
| 2,448,649 | 9/1948 | Adams et al. | 251/205 X |
| 3,415,281 | 12/1968 | Perlman | 137/625.4 |
| 3,920,043 | 11/1975 | Fowell | 137/625.4 X |

Primary Examiner—Arnold Rosenthal
Attorney, Agent, or Firm—James B. Raden; Donald J. Lenkszus

[57] ABSTRACT

A valve slide plate is described in which flow noises are reduced. A flow passage for regulating through-flow volume or mixture is recessed in the surface of the valve plate. The flow passage is of expanded cross-section within the plate.

4 Claims, 3 Drawing Figures

SLIDE PLATE FOR VALVES

BACKGROUND OF THE INVENTION

1. Field of the Invention

The invention relates generally to a slide valve element of the type used in faucets to regulate the mixture ratio and/or the volume of fluids and particularly to an improved noise reduced slide valve.

DESCRIPTION OF THE PRIOR ART

Faucets of the type in which the invention may be employed typically have a valve body formed with a pair of passages arranged for connection to hot and cold water lines. A third passage is arranged to communicate with a spout on the like for the valve discharge. A mixing valve within the valve body comprises a valve seat fixed within the body and a slide valve positioned in sliding engagement with a surface of the valve seat. The valve seat has two inlet apertures in communication with the hot and cold water passages and a third outlet aperture in communication with the outlet passage. The slide valve has a flow channel recess or overflow passage in its surface arranged so that movement of the slide valve controls communication between the inlet and outlet apertures.

One previously known problem with such valve arrangements is that they are susceptible to the development of noises which may make the faucet commercially unacceptable. Various solutions to this problem have been previously provided. One solution taught by German Patent DT-OS No. 2,356,211 requires securing a flexible element filled with air and screener plates in the overflow passage.

However, this solution is relatively expensive and further, the flexible body filled with air is exposed to solid particles entrained in the water so that functional failure and damage may occur after extended use.

Another solution taught by U.S. Pat. No. 3,893,482 utilizes a plurality of overlapping screens disposed within the flow channel recess.

This solution requires additional assembly steps and therefore also appears to be relatively expensive.

Other solutions are taught by U.S. Pat. No. 3,433,264 and in copending U.S. Pat. application Ser. No. 861,576 filed Dec. 19, 1977.

SUMMARY OF THE INVENTION

A low noise slide valve in accordance with the invention includes a slide plate having an aperture of a first predetermined cross-sectional area in communication with a chamber having a greater predetermined cross-sectional area.

Further in accordance with the invention, the valve slide plate comprises a sealing disc and a covering and guiding section.

By means of these measures in accordance with the invention, as has also been confirmed by experiments, a considerable reduction in flow noises in the valve is obtained. In an embodiment of the invention, the sealing disc advantageously comprise oxide ceramic material having a single aperture and a cover and guiding section made of plastic material with good sliding properties which closes the rear side of the sealing disc. By this means, the area of the transfer passage closed by the cover section can be designed with optimum dimensions as regards width and length. In the area of the cover section at which liquid comes into contact from the transfer passage, the surface can be provided at favorable cost with porous, rough or other noise-dampening structures of other kinds. Also, strainers, etc. can be cast into the cover section in a simple manner parallel to the sealing disc.

BRIEF DESCRIPTION OF THE DRAWING

A better understanding of the invention may be had from the following detailed description of several embodiments of the invention taken in conjunction with the drawing in which.

DETAILED DESCRIPTION OF THE DRAWING

Figure 1:
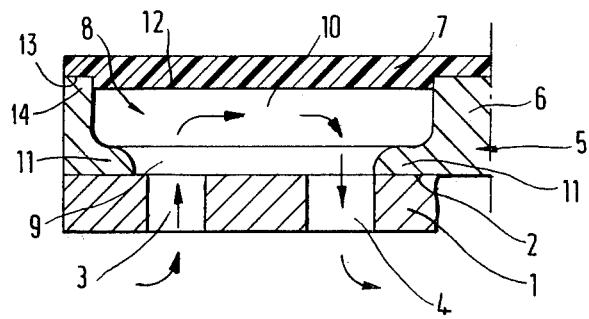
FIG. 1 shows a sectional view of a slide valve in accordance with the invention.
Figure 2:
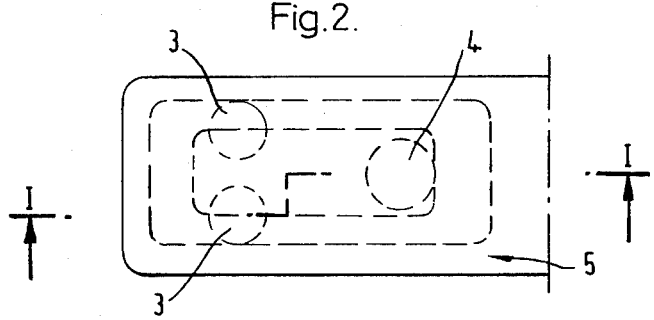
FIG. 2 shows a plan view of the slide valve of FIG. 1.

FIGS. 1 and 2 show a slide valve for regulating the mixture ratio and outflow volume for hot and cold water. The valve consists of a base-plate 1 of oxide ceramic material anchored in a valve housing which is not shown and having inflow apertures 3 for hot and cold water and an outlet aperture 4 for the mixed water. The inlet and outlet apertures are connected, sealed in the housing with separate water guides. A valve slide plate 5 rests on the base-plate. Here, the valve slide plate consists of a sealing disc 6 of oxide ceramic material and a cover and guiding section 7 of plastic material with good sliding properties. The cover and guiding section 7 includes a channel 13 adapted to receive shoulder 14 of sealing disc 6 and both parts are connected to each other in form-fitting manner and can, for example, be glued together or sealed against each other by means of other sealing means. The sealing disc 6 and the base-plate 1 are in contact with each other with a sealing surface 2 prepared with particular accuracy. The valve slide plate 5 can be moved to the base-plate 1 by a control element (not shown) which continues along the broken line to the right of FIG. 1.

A transfer passage 8 is formed in the sealing disc 6 as a through-aperture, a reduced aperture 9, pointing towards the base-plate 1, is determined in its length by the wall thickness 11 required for strength reasons. The aperture 10, pointing towards the cover and guiding section 7 and considerably extended beyond the aperture 9, substantially encloses the entire space available.

Figure 3:
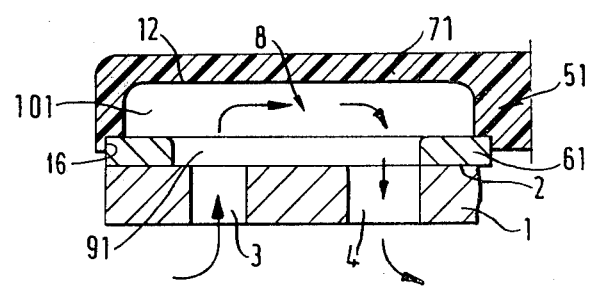
FIG. 3 shows a sectional view of another slide valve in accordance with the invention.

Another example of an embodiment of a slide valve is shown in FIG. 3. Likewise, in this embodiment, a base-plate 1 is arranged in the valve housing with appropriate apertures. Here the sealing plate is in the form of a flat sealing disc 61 with a small aperture 91 passing straight through. The edge 15 of flat sealing disc 61 is held and sealed in form-fitting manner in a channel 16 of a cover and guiding section 71 of plastic material with good sliding properties. The cover and guiding section 71 includes an aperture 101 which is larger than the aperture 91. With this embodiment, the sealing disc reverts to an extremely simple form in view of the difficult manipulability of the oxide ceramic material.

The bottom surface 12 of the transfer passage 8 in the cover and guiding section 7 and 71 can be provided with a rough or porous structure, or strainers, etc. can also be cast in the cover and guiding section 7 and 71 made of plastic material parallel to the slide plate 5 and 51. These and other modifications will be apparent to those skilled in the art without departing from the spirit and scope of the invention.

What is claimed is:

1. In a mixing valve having control elements formed by a valve seat plate and a valve slide plate, the valve seat plate being stationary and having first and second inlet apertures respectively coupled on one side to first and second liquid sources and having an outlet aperture coupled on said one side to an outlet port, the valve slide plate having a surface adapted to slidingly engage the other side of said valve seat plate, said valve slide plate including a transfer passage recessed into said surface, said valve slide plate being movable relative to said valve seat plate to place said transfer passage in communication said first and second inlet apertures and said outlet aperture to regulate the through-flow volume and/or mixture ratio of liquids, the improvement wherein said transfer passage comprising an aperture of a first predetermined cross-sectional area in said surface, and a chamber formed inside said valve slide plate, said chamber having a second predetermined cross-sectional area greater than said first predetermined cross-sectional area, and said chamber being in fluid communication with said aperture; and wherein said valve slide plate comprises a flat sealing disc having said aperture; and a covering and guiding section including a surface having a channel adapted to receive and sealingly engage an edge portion of said flat plate;

said chamber comprising a recess in said covering and guiding section, said recess extending around said aperture.

2. A mixing valve in accordance with claim 1, wherein said cover and guiding section comprises a plastic material having relatively good sliding properties, and said sealing disc comprises a ceramic oxide material.

3. In a mixing valve having control elements formed by a valve seat plate and a valve slide plate, the valve seat plate being stationary and having first and second inlet apertures respectively coupled on one side to first and second liquid sources and having an outlet aperture coupled on said one side to an outlet port, the valve slide plate having a surface adapted to slidingly engage the other side of said valve seat plate, said valve slide plate including a transfer passage recessed into said surface, said valve slide plate being movable relative to said valve seat plate to place said transfer passage in communication said first and second inlet apertures and said outlet aperture to regulate the through-flow volume and/or mixture ratio of liquids, the improvement wherein, said transfer passage comprising an aperture of a first predetermined cross-sectional area in said surface, and a chamber formed inside said valve slide plate, said chamber having a second predetermined cross-sectional area greater than said first predetermined cross-sectional area, and said chamber being in fluid communication with said aperture; and wherein said valve slide plate comprises a sealing disc comprising a ceramic oxide material and including said aperture, and a covering and guiding section comprising a plastic material having relatively good sliding properties and adapted to sealingly engage said sealing disc opposite said surface, said sealing disc forming said chamber.

4. A mixing valve in accordance with claim 3 wherein said aperture includes a first portion of said first predetermined cross-sectional area adjacent said surface, and a second portion forming said chamber opposite said surface, said second portion having said second predetermined cross-sectional area and extending beyond said first portion, and said covering and guiding section is disposed on said sealing disc adjacent said second portion.

* * * * *